(12) United States Patent
Morin

(10) Patent No.: US 10,897,628 B2
(45) Date of Patent: *Jan. 19, 2021

(54) SYSTEM AND METHOD FOR IMPROVED VIDEO OPERATIONS

(71) Applicant: Verint Americas Inc., Alpharetta, GA (US)

(72) Inventor: Francois Morin, Montreal (CA)

(73) Assignee: Verint Americas Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/156,137

(22) Filed: Oct. 10, 2018

(65) Prior Publication Data

US 2019/0045208 A1   Feb. 7, 2019

Related U.S. Application Data

(60) Continuation of application No. 15/830,958, filed on Dec. 4, 2017, now Pat. No. 10,142,646, which is a continuation of application No. 15/155,269, filed on May 16, 2016, now Pat. No. 9,866,858, which is a division of application No. 13/926,542, filed on Jun. 25, 2013, now Pat. No. 9,344,724.

(60) Provisional application No. 61/663,972, filed on Jun. 25, 2012.

(51) Int. Cl.
| | | |
|---|---|---|
| *H04N 7/18* | (2006.01) | |
| *H04N 19/46* | (2014.01) | |
| *H04N 9/79* | (2006.01) | |
| *G11B 27/32* | (2006.01) | |
| *H04N 5/77* | (2006.01) | |
| *H04N 9/804* | (2006.01) | |
| *H04N 9/82* | (2006.01) | |
| *H04N 19/85* | (2014.01) | |
| *G08B 13/19* | (2006.01) | |

(52) U.S. Cl.
CPC ........... *H04N 19/46* (2014.11); *G11B 27/322* (2013.01); *H04N 5/772* (2013.01); *H04N 9/79* (2013.01); *H04N 9/8042* (2013.01); *H04N 9/8205* (2013.01); *H04N 19/85* (2014.11)

(58) Field of Classification Search
USPC ......................... 348/142, 143, 154, 155, 161
See application file for complete search history.

(56) References Cited

U.S. PATENT DOCUMENTS

| | | |
|---|---|---|
| 6,646,676 B1 | 11/2003 | DeGraca et al. |
| 8,872,964 B2 | 10/2014 | Reed |
| 2006/0083310 A1 | 4/2006 | Zhang |
| 2007/0230576 A1* | 10/2007 | Heller ............. H04N 19/51 375/240.16 |
| 2013/0057685 A1 | 3/2013 | Roskowski |
| 2013/0162518 A1* | 6/2013 | Athavale ............ G09G 5/00 345/156 |

* cited by examiner

*Primary Examiner* — Daquan Zhao
(74) *Attorney, Agent, or Firm* — Christopher M. Scherer; DeWitt LLP

(57) ABSTRACT

A method of video operations includes generating derivative byproducts related to encoded video captured of a scene, initializing a first operation based on the encoded video, and initializing a second operation different from the first operation based on the derivative byproducts.

19 Claims, 4 Drawing Sheets

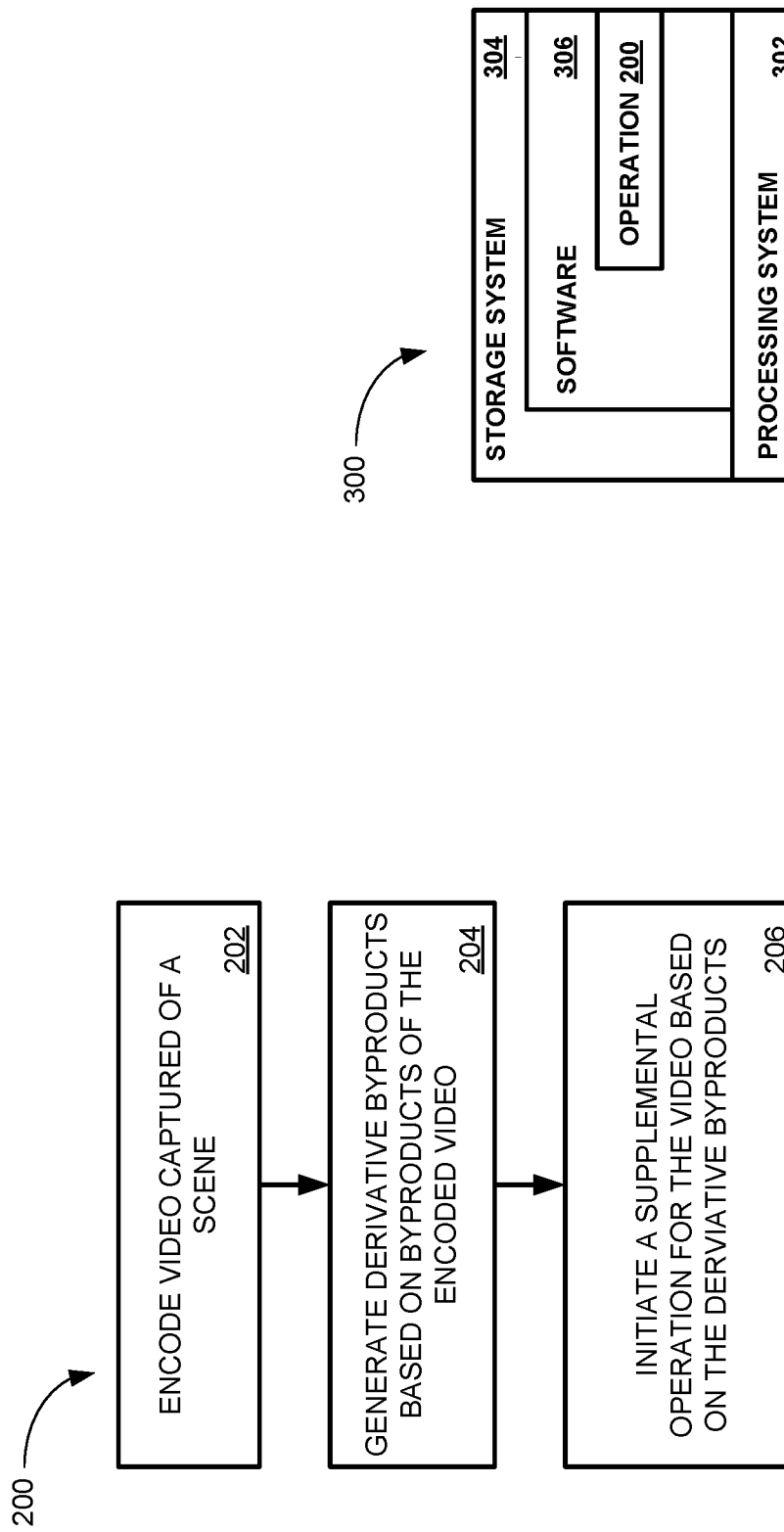

SYSTEM AND METHOD FOR IMPROVED VIDEO OPERATIONS

CROSS-REFERENCE TO RELATED APPLICATION(S)

The present application is a continuation of U.S. patent application Ser. No. 15/830,958, filed on Dec. 4, 2017, which is a continuation of U.S. patent application Ser. No. 15/155,269, filed on May 16, 2016, which is a division of U.S. patent application Ser. No. 13/926,542, filed Jun. 25, 2013, and claims priority of U.S. Provisional Patent Application No. 61/663,972, filed Jun. 25, 2012, the contents of which are incorporated herein by reference in their entireties.

BACKGROUND

Video systems often include video recording devices, encoders, decoders, and client devices. These devices, when combined, allow for video processing on a recorded scene.

Examples of video processing include encoding a compressed version of the recorded scene, streaming the recorded scene, and applying video analytics on the recorded scene. Video compression is a method of encoding video using fewer bits than the original representation. To accomplish this task, encoders will compare one image with previous images to determine changes in the images. As the portions of the image that have not changed are redundant, the encoder will only encode the portions of the image that have changed. Thus, the video requires fewer bits than the original representation.

Additionally, during these encoding methods the encoder can generate byproducts. A byproduct is any information about the video generated during the encoding process, but may not necessarily be used in the final compressed video.

SUMMARY

A method of video operations includes generating derivative byproducts related to encoded video captured of a scene, initializing a first operation based on the encoded video, and initializing a second operation different from the first operation based on the derivative byproducts.

In one embodiment of the present application, a computerized method of facilitating video operations includes initiating an encoding operation to encode video captured of a scene from a video capture device, resulting in encoded video, initiating a derivative operation to generate derivative byproducts based on byproducts of the encoding operation, and initiating a supplemental operation, supplemental to a primary operation that involves the encoded video, based on at least a portion of the derivative byproducts.

In another embodiment of the present application, a non-transitory computer-readable medium having instruction stored thereon for facilitating video operation, wherein the instructions, when executed by the processing system, direct the processing system to initiate an encoding operation to encode video captured of a scene from a video capture device, resulting in encoded video, initiate a derivative operation to generate derivative byproducts based on byproducts of the encoding operation, and initiate a supplemental operation, supplemental to a primary operation that involves the encoded video, based on at least a portion of the derivative byproducts.

In another embodiment of the present application, a computerized method of generating video byproducts comprises defining a plurality of macroblocks, wherein the plurality of macroblocks overlay a scene to be reported, recording a plurality of images of the scene, comparing motion of an object between a plurality of images by comparing a change in position of a macroblock that overlays the object, recording the motion as a byproduct by recording a number of pixels of change in position of the macroblock, and measuring a magnitude of the change in position of the macroblock.

BRIEF DESCRIPTION OF THE DRAWINGS

FIG. 2 is a flow diagram illustrating the operation of a video operations environment according to an embodiment of the present application.

FIG. 3 is a block diagram illustrating a video processing environment according to an embodiment of the present application.

DESCRIPTION

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

Systems and methods are provided herein to improve video operations. In one example, the method includes receiving data from a video capture device that is configured to record a designated scene. The video is then encoded and derivative byproducts are generated using byproducts from the encoding operation. Finally, the encoded video and derivative byproducts are used for primary and supplemental operations.

Figure 1:
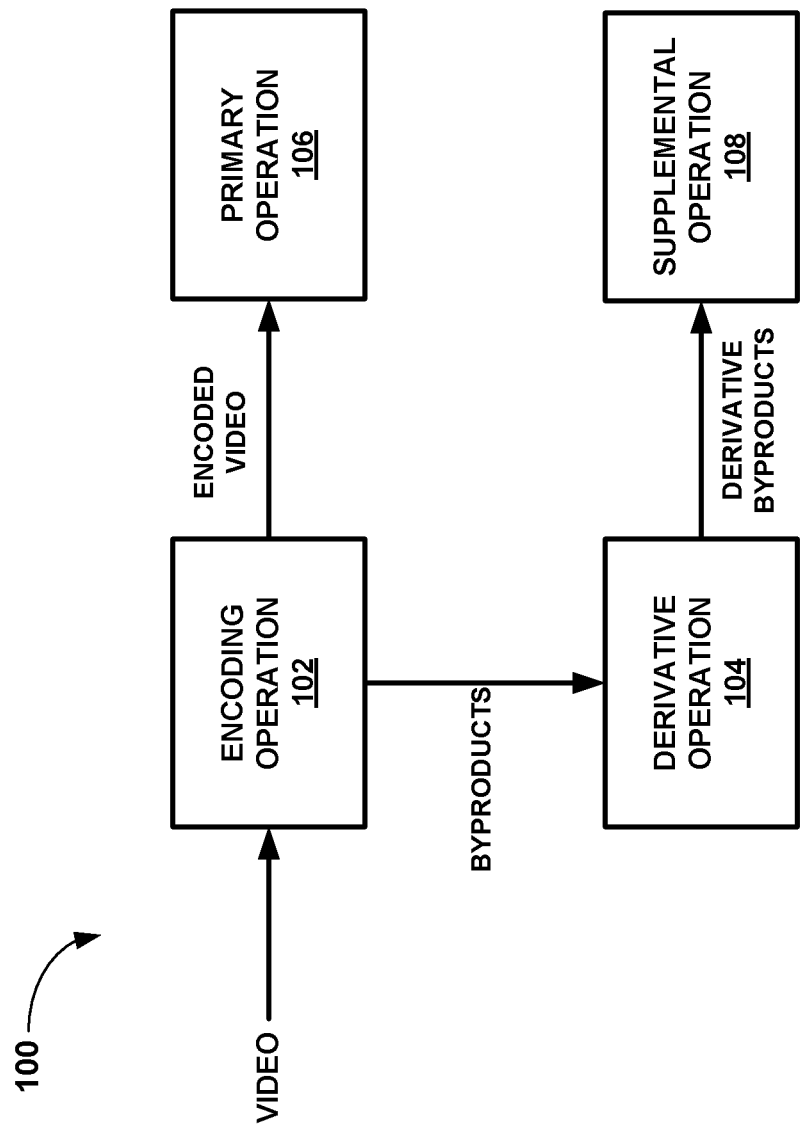
FIG. 1 is a block diagram illustrating a video operations environment according to an embodiment of the present application.

FIG. 1 illustrates a video operations environment 100 according to one example. Video operations environment 100 includes encoding operation 102, derivative operation 104, primary operation 106, and supplemental operation 108.

Encoding operation 102 is connected to primary operation 106 and derivative operation 104. Derivative operation 104 is also connected to supplemental operation 108.

Encoding operation 102 includes any operation capable of encoding video and generating video byproducts. Derivative operation 104 includes any operation capable of receiving byproducts and producing derivative byproducts. Primary operation 106 includes any operation that uses the encoded video, such as displaying the video, storing the video, or streaming the video. Supplemental operation 108, which is different than primary operation 106, includes any operation that uses the derivative byproducts such as highlighting a specific portion of the video, setting an alert, or changing the position of a camera.

FIG. 2 illustrates the operation 200 of video operations environment 100 according to an embodiment. Referring to FIGS. 1 and 2 simultaneously, encoding operation 102 receives video from any device capable of video capture such as, for example, a video camera. In turn, encoding operation 102 produces encoded video and byproducts related to the video encoding, (operation 202). These byproducts may include information about the movement of objects within a scene, the signal to noise ratio of the video, and the quantity of high frequency coefficients in the video.

Next, derivative operation 104 takes in the byproducts from encoding operation 102 and operates to produce derivative byproducts for use in supplemental operation 108, (operation 204). These derivative byproducts may be the same as the original byproducts, may be modified versions of the byproducts, or may be added byproducts such as time stamps and alert requirements.

Finally, the encoded video is used for a primary operation 106 and the derivative byproducts are used for supplemental operation 108, (operation 206). Examples of the primary operation include displaying the video, storing the video, streaming the video, or any other operation that could be done with the encoded video. Examples of the supplemental operation, which is different than primary operation, include highlighting a specific portion of the video, setting an alert, changing the position of the camera, or any other operation that would be beneficial to analyzing the video.

Further description of operation 200 may be found in the provisional application, to which the present application claims priority and is incorporated by reference. For example, a supplemental operation may be initiated 206 that includes indicating that the state of motion detection capability has changed, has been changed to OFF, or has been changed to ON, and a time stamp for the generation of each is created.

FIG. 3 illustrates a video processing environment 300 according to one example. The system includes processing system 302, storage system 304, software 306, and operation 200. Processing system 302 loads and executes software 306 including operation 200 from storage system 304. When executed by video processing environment 300, software 306 directs the video processing environment 300 to process operation 200.

Processing system 302 may comprise a microprocessor and other circuitry that retrieves and executes software 306 from storage system 304. Processing system 302 may be implemented within a single processing device but may also be distributed across multiple processing devices or subsystems that cooperate in executing program instructions. Examples of processing system 302 include general purpose central processing units, application specific processors, and logic devices, as well as any other type of processing device, combinations of processing devices, or variations thereof.

Storage system 304 may comprise any storage media readable by processing system 302 and capable of storing software 306. Storage system 304 may include volatile and nonvolatile, removable and non-removable media implemented in any method or technology for storage of information, such as computer readable instructions, data structures, program modules, or other data. Storage system 304 may be implemented as a single storage device but may also be implemented across multiple storage devices or subsystems. Storage system 304 may comprise additional elements, such as a controller, capable of communicating with processing system 302.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In some implementations, the storage media may be a non-transitory storage media. In some implementations, at least a portion of the storage media may be transitory. It should be understood that in no case is the storage media a propagated signal.

Figure 4:
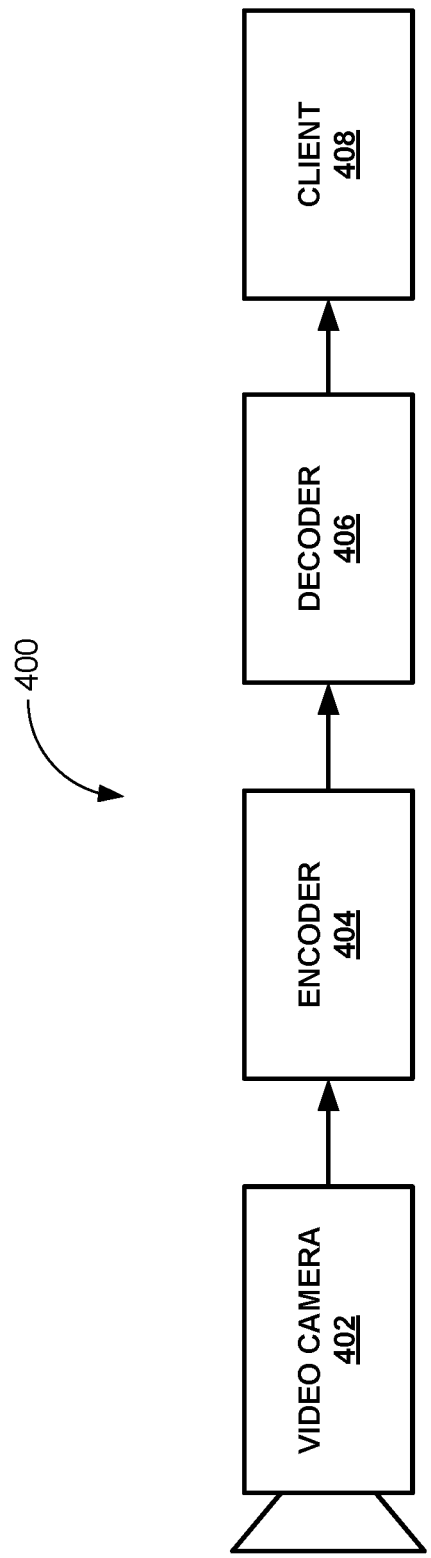
FIG. 4 is a block diagram illustrating a video operations system according to an embodiment of the present application.

FIG. 4 illustrates a video operations system 400 according to an embodiment of the present application. In this example video system 400, encoder 404 is coupled with video capture device 402 and decoder 406. In turn, decoder 406 is coupled with client 408.

Encoder 404 is configured to encode the video from video camera 402 using any known compression method, and is also configured to generate derivative byproducts such as the motion of objects within the images from video camera 402. For example, it may be desirable to track the specific movements of objects within the scene or detect if an object has entered the scene. Encoder 404 then transmits the derivative byproducts and encoded video data to decoder 406 and client 408. The transmission of the data could be wired or wireless and use a variety of transmission means.

Furthermore, in addition to gathering information regarding the movement of an object, encoder 404 could generate other derivative byproducts such as the signal-to-noise ratio, which may give clues as to what is contained in the scene, and the quantity of high frequency coefficients, which may help in determining the focus level of the camera.

Moreover, other derivative byproducts that may be generated by encoder 404 could include a time stamp of when movement occurred, the amount of movement needed to trigger an alarm, and the amount of movement needed to turn the alarm off.

In one example, decoder 406 may be any type of programmable circuitry configured to decode the encoded data from encoder 404.

In another example, decoder 406 may be software or hardware of client 108 such that the client 108 is configured to decode the data from encoder 404.

Client 408 may include a personal computer, server, or other programmable circuitry configured to parse the data passed by decoder 406, and configured to process primary operation 106 and supplemental operation 108. Additionally, client 408 may include a monitor, television, or other viewing platform where a user may view the video. Furthermore, client 108 may include a database, memory, disc drive, or other storage device configured to store the derivative byproducts and video data.

Figure 5:
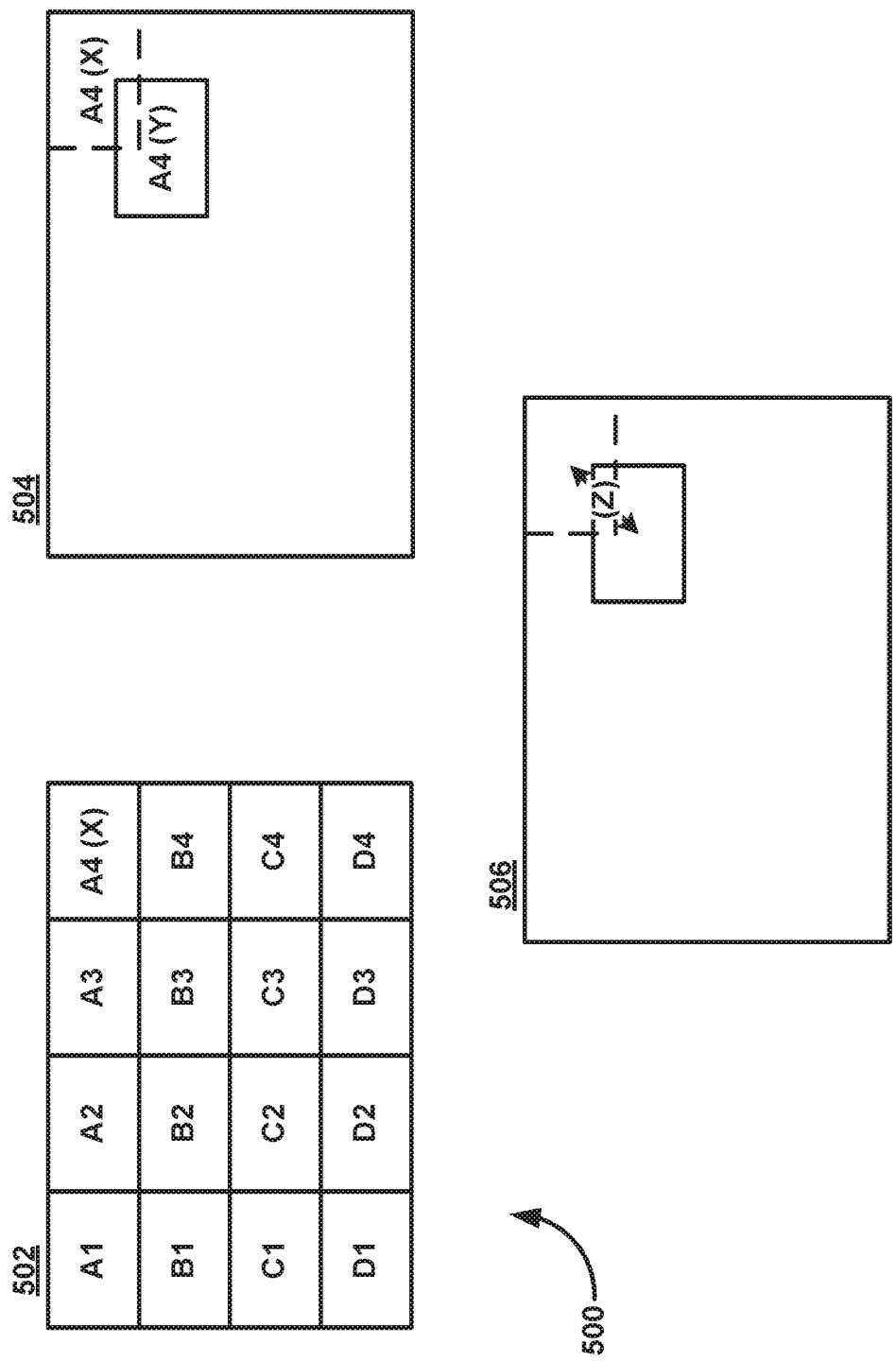
FIG. 5 is a block diagram illustrating a method of generating derivative byproducts according to an embodiment of the present application.

FIG. 5 illustrates a method 500 of generating derivative byproducts according to one example. As shown in FIG. 5, the method begins at 502 by the encoding operation 102 defining blocks of pixels or macroblocks for the recorded scene. Blocks A1-D4 define the macroblocks in the present example.

Next, as illustrated by step 504, the encoding operation 102 will compare the motion of objects between images using the macroblocks. In example 504, macroblock A4 has moved from its original position in 502 (X) to its new position in 504 (Y). In other words, between the images in 502 and 504 an object in A4 has moved, thus resulting in the moving macroblock. This movement may then be recorded as a byproduct by recording the number of pixels the block moved horizontally and vertically.

Finally, at step 506, the derivative operation will measure the magnitude of the movement of macroblock A4 (Z). This magnitude may be calculated using vertical and horizontal movement byproducts from encoding operation 102. In the present example only a single macroblock had object movement, however, it should be recognized that multiple macroblocks could have object movement between images.

In one example, the movement magnitudes for each macroblock could be included in a header with the encoded video data such that the movement within the video could be highlighted by supplemental operation. In other words, using the example above, the area around macroblock A4 may be highlighted or an alarm may be created based on the movement.

In another example, the movement magnitudes for each macroblock could be sent separate of the encoded video data such that the movement within the video could be highlighted at client 108. In other words, using the example above, the area around macroblock A4 may be highlighted or an alarm may be created based on the movement.

In a further embodiment, the motion map implementation includes a fixed resolution to match VSIP mask string convention and can only be obtained for one input at the time. The motion map implementation always matches the video frame is it attached to, and every motion map entry is a byte-value giving the current level of motion (0-255) in the corresponding macroblock (instead of a single on/off bit in the legacy motion bitmap).

In a further embodiment, the motion map will include in a data buffer attached to the frame, energy vector, current motion state, upper threshold, lower threshold, vector length and number of macroblocks in motion.

The energy vector is added to send the motion map through a RTP extension which only supports one extension at a time. The motion may be enabled or disabled by the user.

Further description of method 500 is included in the provisional application, to which the present application claims priority and is incorporated by reference.

It should be further noted that enabling the motion map on a given input will automatically stop the motion map on any input for which is it currently enabled since only one instance of motion map at a time is supported.

In one embodiment, the motion map data that will be sent will have a structure wherein the width and height of the map is given in number of macroblocks. For example:
Header:
|—4 bytes—|2 bytes|—2 bytes—|—2 bytes—|2 bytes|—2 bytes—|—2 bytes—|2 bytes|2 bytes|N bytes |Energy Vect-|Status|Upper Thrsh|Lower Thrsh|Vct Len|Tot #MB Mot|Msk #MB Mot|Width|Height|Motion Map
Total=20 bytes header+(Width*Height) bytes for motion map data A brief description of each field is as follows:
Energy vector (4 bytes): An indication of quantity of motion in a video frame;
Upper Threshold; Minimum number of macroblock in motion to trigger an alarm (2 bytes);
Lower Threshold; Maximum number macroblock to lower motion alarm (2 bytes);
Vector Length; Level of motion to consider a macroblock as in motion (2 bytes);
Number of macroblocks in motion in the entire frame (2 bytes);
Number of macroblocks in motion in the mask (2 bytes);
Width macroblock, will always be equal to 44 (2 bytes);
Height in macroblock, 30 in NTSC, 36 in PAL (2 bytes); and
Motion map (1320 in NTSC or 1584 in PAL bytes depending of the video standard)

A graphical example of the motion map is included in the table below. For this example, a 12×9 motion map is depicted (instead of 44×30 NTSC or 44×36 PAL). Also, the cells that are bolded correspond to a macroblock that is in motion (above the upper threshold). Each byte represents a different macroblock.

| 12 | 10 | 0 | 1 | 4  | 6 | 8 | 2 | 0  | 34  | 0   | 0   |
|----|----|---|---|----|---|---|---|----|-----|-----|-----|
| 0  | 0  | 0 | 0 | 1  | 0 | 0 | 0 | 0  | 0   | 0   | 0   |
| 0  | 1  | 0 | 0 | 12 | 0 | 0 | 0 | 0  | 56  | 100 | 76  |
| 0  | 5  | 0 | 0 | 0  | 0 | 0 | 0 | 0  | 42  | 240 | 0   |
| 0  | 0  | 0 | 0 | 23 | 0 | 0 | 0 | 67 | 43  | 0   | 200 |
| 0  | 34 | 0 | 0 | 0  | 0 | 0 | 0 | 77 | 0   | 0   | 0   |
| 0  | 0  | 0 | 0 | 0  | 0 | 0 | 0 | 55 | 110 | 0   | 0   |
| 0  | 21 | 0 | 0 | 0  | 11| 0 | 0 | 0  | 0   | 0   | 0   |
| 0  | 1  | 0 | 0 | 0  | 0 | 0 | 0 | 0  | 5   | 0   | 2   |

To ensure the motion map is synchronized with its corresponding video frame, an extension may be added containing the motion map, only when the motion map is enabled.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that tell within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A computerized method of facilitating video operations comprising:
   producing, by an encoder of a computer system, compressed video data from source video data output by a video capture device, the source video data capturing a scene;
   identifying, by the encoder as part of the producing, a plurality of macroblocks;

outputting, by the encoder as an initial byproduct of the producing, data characterizing motion corresponding to at least one macroblock of the plurality of macroblocks;

generating, by the computer system, a derivative byproduct based on the initial byproduct, the derivative byproduct quantifying motion corresponding to the at least one macroblocks;

generating a motion map using the generated derivative byproducts, the motion map being associated with a video frame and providing a byte-value representation of motion of a corresponding macroblock; and implementing the motion map and synchronizing the motion map with the associated video frame.

2. The computerized method of claim 1, wherein the derivative byproduct includes at least one of a signal-to noise ratio and a quantity of high frequency coefficients.

3. The computerized method of claim 1, wherein the derivative byproduct includes any of a time stamp, an alert requirement, a time stamp of when movement occurred, the amount of movement needed to trigger an alarm, or the amount of movement needed to turn the alarm off.

4. The computerized method of claim 1, the method further comprising synchronizing the motion map with the video frame using an extension.

5. The computerized method of claim 1, wherein the motion map is one of enabled and disabled by the user.

6. The computerized method of claim 1, wherein the supplemental operation includes any of highlighting a specific portion of the scene as displayed, setting an alert or changing a position of the video capture device.

7. The computerized method of claim 1, wherein the primary operation includes any of displaying, streaming or storing the encoded video.

8. The computerized method of claim 1, further comprising transmitting the derivative byproduct and compressed video data to a decoder of the computer system.

9. The computerized method of claim 1, wherein the motion map is included in a header attached to the video frame.

10. The computerized method of claim 9, wherein the header further includes at least one of an energy vector, a current motion state, an upper threshold, a lower threshold, a vector length, a number of macroblocks in motion in a frame, a number of macroblocks in motion in a mask, a height of the motion map in macroblocks, or a width of the motion map in macroblocks.

11. A non-transitory computer-readable medium having instructions stored thereon for facilitating video operation, wherein the instructions, when executed by a processing system, direct the processing system to:

produce compressed video data from source video data output by a video capture device, the source video data capturing a scene;

identify, as part of producing the compressed video data, a plurality of macroblocks;

output, as an initial byproduct of producing the compressed video data, data characterizing motion corresponding to at least one macro block of the plurality of macroblocks;

generate a derivative byproduct based on the initial byproduct, the derivative byproduct quantifying motion corresponding to the at least one macroblock;

generate a motion map using the generated derivative byproducts, the motion map being associated with a video frame and providing a byte-value representation of motion of a corresponding macroblock; and implement the motion map and synchronize the motion map with the associated video frame.

12. The non-transitory computer-readable medium of claim 11, wherein the derivative byproduct includes at least one of a time stamp, an alert requirement, a time stamp of when movement occurred, the amount of movement needed to trigger an alarm, and the amount of movement needed to turn the alarm off.

13. The non-transitory computer-readable medium of claim 11, wherein the derivative byproduct includes at least one of a signal-to noise ratio and a quantity of high frequency coefficients.

14. The non-transitory computer-readable medium of claim 11, further directing the processing system to synchronize the motion map with the video frame using an extension.

15. The non-transitory computer-readable medium of claim 11, wherein the supplemental operation includes any of highlighting a specific portion of the scene as displayed, setting an alert of changing a position of the video capture device.

16. The non-transitory computer-readable medium of claim 11, wherein the supplemental operation includes generating an indication that a state of motion detection capability has changed and creating a time stamp for the generated indication.

17. The non-transitory computer-readable medium of claim 11, wherein the primary operation includes any of displaying, streaming or storing the encoded video.

18. The non-transitory computer-readable medium of claim 11, wherein the motion map is included in a header attached to the video frame.

19. The non-transitory computer-readable medium of claim 18, wherein the header further includes at least one of an energy vector, a current motion state, an upper threshold, a lower threshold, a vector length, a number of macroblocks in motion in a frame, a number of macroblocks in motion in a mask, a height of the motion map in macroblocks, or a width of the motion map in macroblocks.

* * * * *